US012359802B1

(12) United States Patent
Xue

(10) Patent No.: US 12,359,802 B1
(45) Date of Patent: Jul. 15, 2025

(54) FAN CEILING LAMP

(71) Applicant: Huankun Xue, Guangxi (CN)

(72) Inventor: Huankun Xue, Guangxi (CN)

( * ) Notice: Subject to any disclaimer, the term of this patent is extended or adjusted under 35 U.S.C. 154(b) by 0 days.

(21) Appl. No.: 19/006,278

(22) Filed: Dec. 31, 2024

(51) Int. Cl.

| | |
|---|---|
| ***F21V 33/00*** | (2006.01) |
| ***F04D 19/00*** | (2006.01) |
| ***F04D 29/52*** | (2006.01) |
| ***F04D 29/54*** | (2006.01) |
| ***F04D 29/70*** | (2006.01) |
| ***F21V 11/16*** | (2006.01) |
| ***F21V 17/00*** | (2006.01) |
| ***F21V 17/16*** | (2006.01) |

(52) U.S. Cl.
CPC ........ *F21V 33/0096* (2013.01); *F04D 19/002* (2013.01); *F04D 29/522* (2013.01); *F04D 29/541* (2013.01); *F04D 29/703* (2013.01); *F21V 11/16* (2013.01); *F21V 17/002* (2013.01); *F21V 17/16* (2013.01)

(58) Field of Classification Search
CPC .... F21V 33/0096; F21V 11/16; F21V 17/002; F21V 17/16; F04D 19/002; F04D 29/522; F04D 29/541; F04D 29/703
See application file for complete search history.

(56) References Cited

U.S. PATENT DOCUMENTS

| | | | | |
|---|---|---|---|---|
| 10,816,163 | B1 * | 10/2020 | Hsu | F21V 13/04 |
| 11,555,598 | B1 * | 1/2023 | Tsai | F21V 19/0045 |
| 11,815,256 | B1 * | 11/2023 | Wang | F21V 33/0096 |
| 2017/0205082 | A1 * | 7/2017 | Kim | F24F 11/63 |
| 2021/0116123 | A1 | 4/2021 | Feng et al. | |
| 2021/0317982 | A1 | 10/2021 | Shao | |
| 2022/0049707 | A1 * | 2/2022 | Cunnane | F04D 29/462 |
| 2022/0128066 | A1 * | 4/2022 | Huang | F21V 33/0096 |
| 2022/0146085 | A1 * | 5/2022 | Zhao | F21V 29/83 |
| 2022/0228717 | A1 * | 7/2022 | Bai | F21V 3/10 |
| 2022/0235782 | A1 * | 7/2022 | Villella | F24F 3/056 |
| 2023/0077609 | A1 * | 3/2023 | Zhang | F04D 29/34 416/204 R |
| 2023/0211037 | A1 * | 7/2023 | Lan | F21V 33/0088 422/22 |

* cited by examiner

*Primary Examiner* — Aaron R Eastman
(74) *Attorney, Agent, or Firm* — S.J. Intellectual Property LTD.

(57) ABSTRACT

A fan ceiling lamp includes a lamp body, provided with an air inlet and an air outlet; a fan assembly, movably mounted in the lamp body, the fan assembly including an impeller ring having a first mounting chamber; and a drive device, mounted in the first mounting chamber. The drive device includes a first portion and a second portion that is connected to the first portion, the first portion extending out of the first mounting chamber and being fixedly assembled with the lamp body, one end of the second portion that is away from the first portion being connected to the impeller ring, and the second portion being capable of rotating relative to the first portion to drive the fan assembly to rotate relative to the lamp body.

17 Claims, 16 Drawing Sheets

FAN CEILING LAMP

CROSS REFERENCE TO RELATED APPLICATIONS

This application claims priority benefits to Chinese Patent Application No. 202422713092X, filed on Nov. 7, 2024, the contents of which are incorporated herein by reference.

TECHNICAL FIELD

The present disclosure relates to the technical field of ceiling lamps, and in particular, to a fan ceiling lamp.

BACKGROUND

A fan ceiling lamp is a household appliance that combines a lamp and a fan, mounted on the ceiling to provide illumination and air circulation.

Typically, a fan lamp usually includes a lamp body, fan blades, and a power device to drive the fan blades to rotate. In the related art, the fan blades are disposed in the lamp body, but the power device is usually arranged outside the lamp body. This configuration increases the overall size of the fan lamp, complicating the packaging and transportation. Additionally, having the power device disposed outside the lamp body increases the spacing between the lamp body and the ceiling, affecting its aesthetics.

SUMMARY OF THE INVENTION

The present disclosure provides the technical solutions as follows: a fan ceiling lamp, including: a lamp body, provided with an air inlet and an air outlet; a fan assembly, movably mounted in the lamp body, the fan assembly including an impeller ring having a first mounting chamber; and a drive device, mounted in the first mounting chamber, the drive device including a first portion and a second portion that is connected to the first portion, the first portion extending out of the first mounting chamber and being fixedly assembled with the lamp body, one end of the second portion that is away from the first portion being connected to the impeller ring, and the second portion being capable of rotating relative to the first portion to drive the fan assembly to rotate relative to the lamp body.

BRIEF DESCRIPTION OF DRAWINGS

The accompanying drawings of the specification, which form part of this application, are used to provide a further understanding of the present disclosure, and the schematic embodiments of the present disclosure and their description are intended to explain the present disclosure and do not constitute an undue limitation of the present disclosure, in which.

REFERENCE NUMERALS

Figure 1:
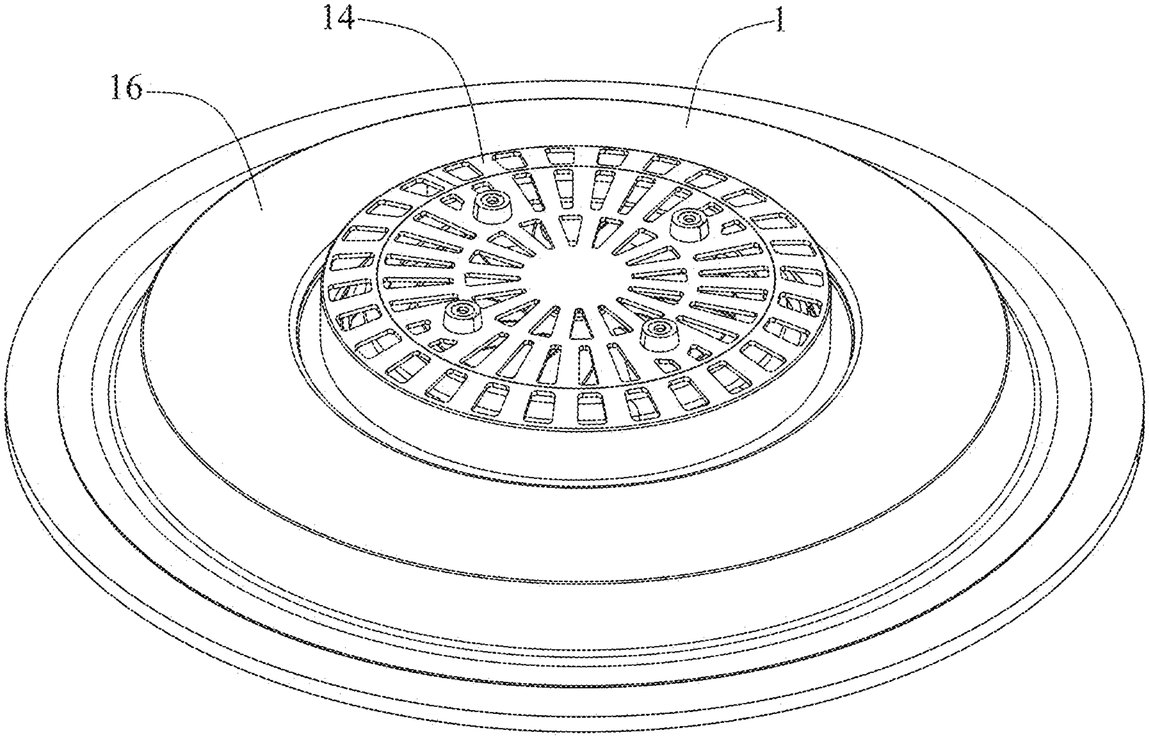
FIG. 1 is an overall schematic structural diagram of a fan ceiling lamp in an embodiment of the present disclosure.
Figure 2:
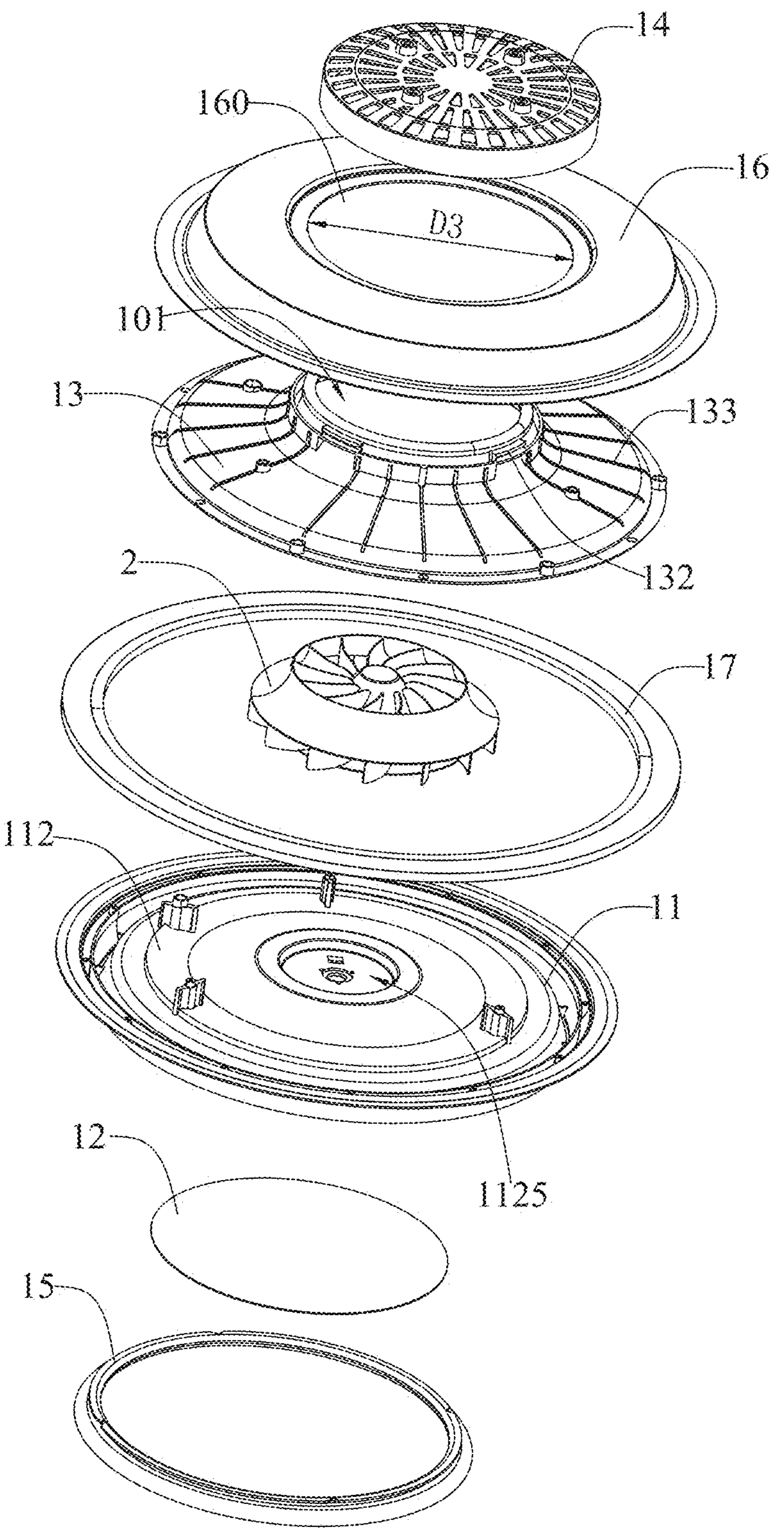
FIG. 2 is an exploded view of a fan ceiling lamp in an embodiment of the present disclosure.
Figure 3:
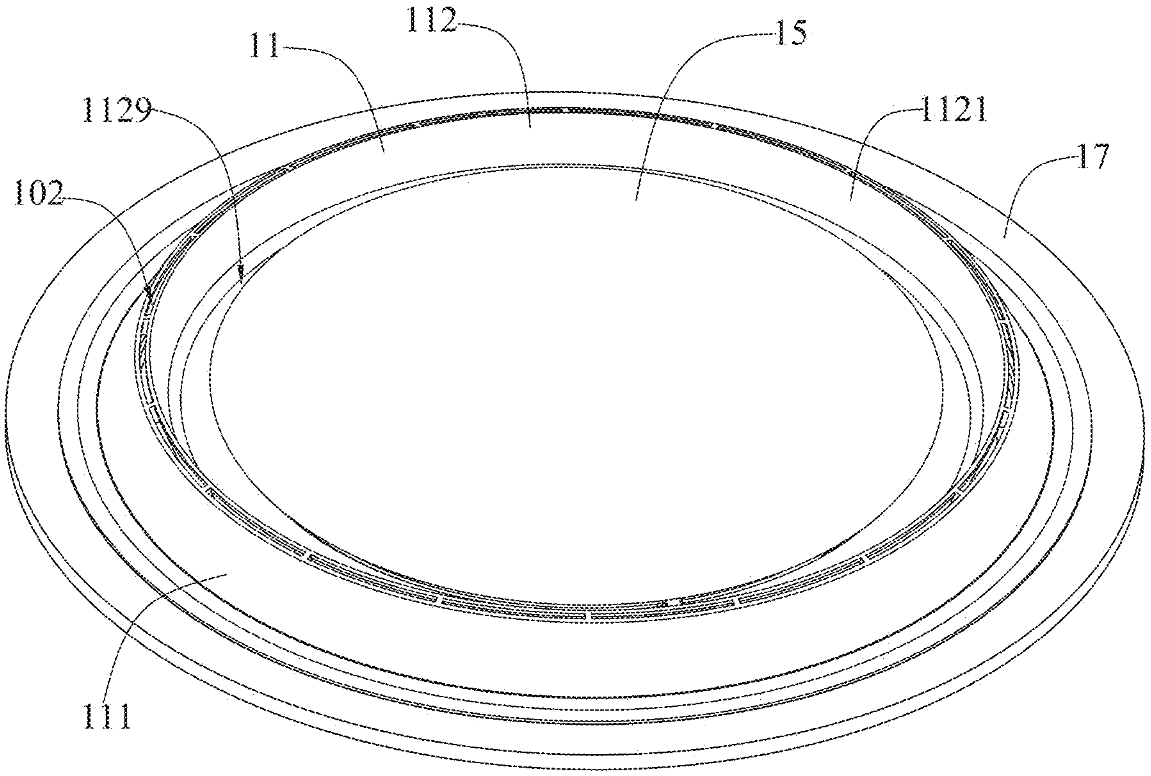
FIG. 3 is an overall schematic structural diagram of a fan ceiling lamp in another embodiment of the present disclosure.
Figure 4:
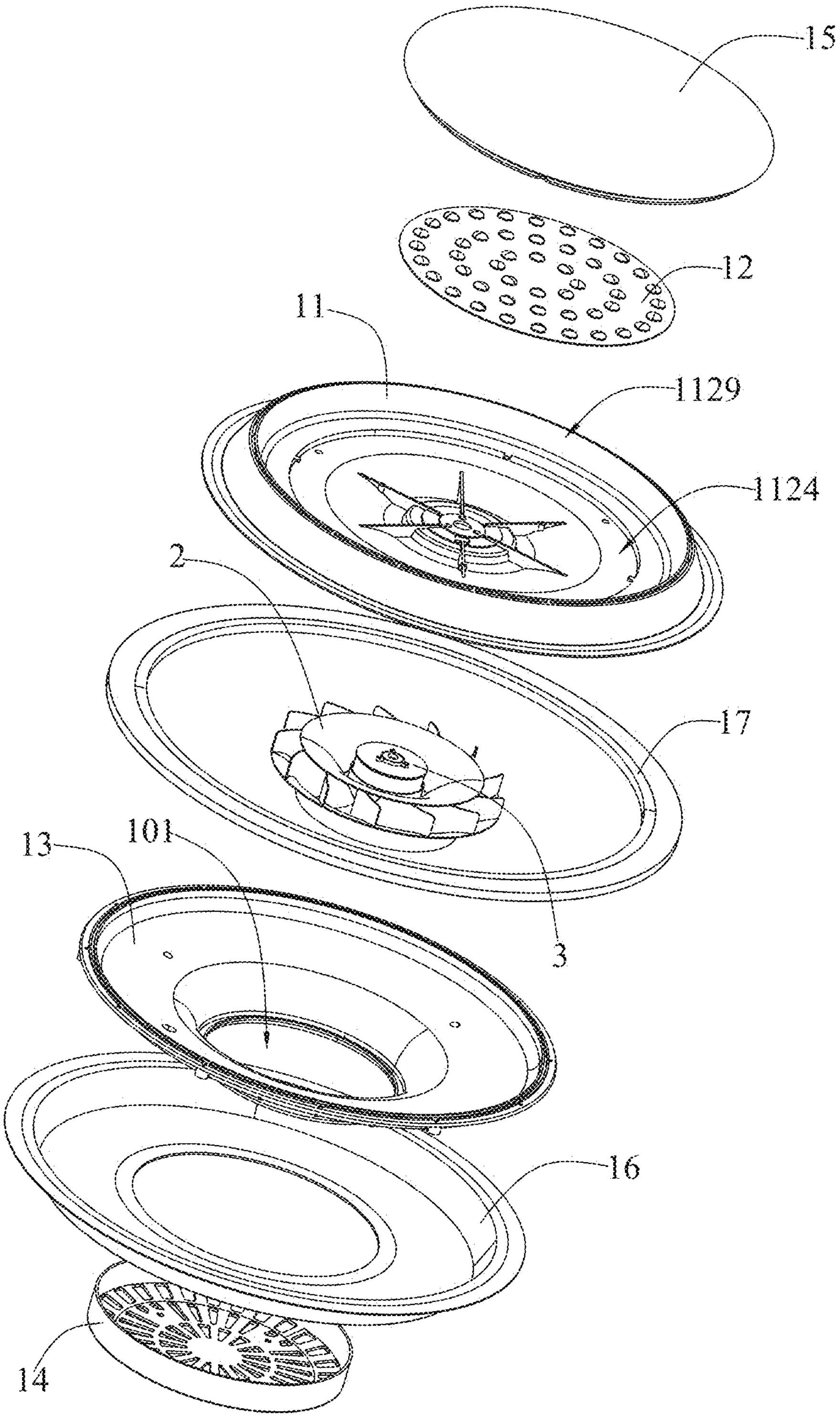
FIG. 4 is an exploded view of a fan ceiling lamp in another embodiment of the present disclosure.
Figure 5:
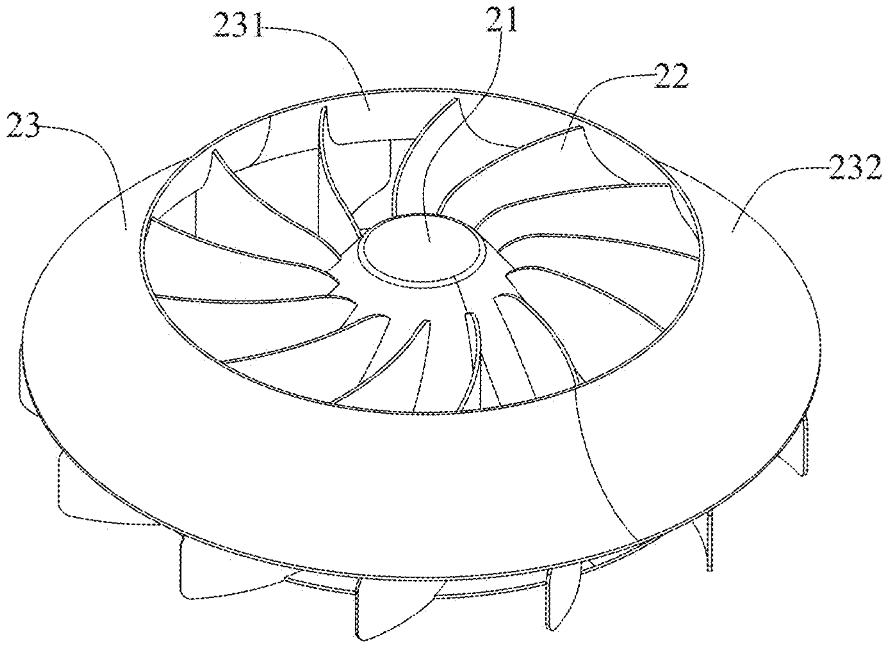
FIG. 5 is a schematic structural diagram of a fan assembly in an embodiment of the present disclosure.
Figure 6:
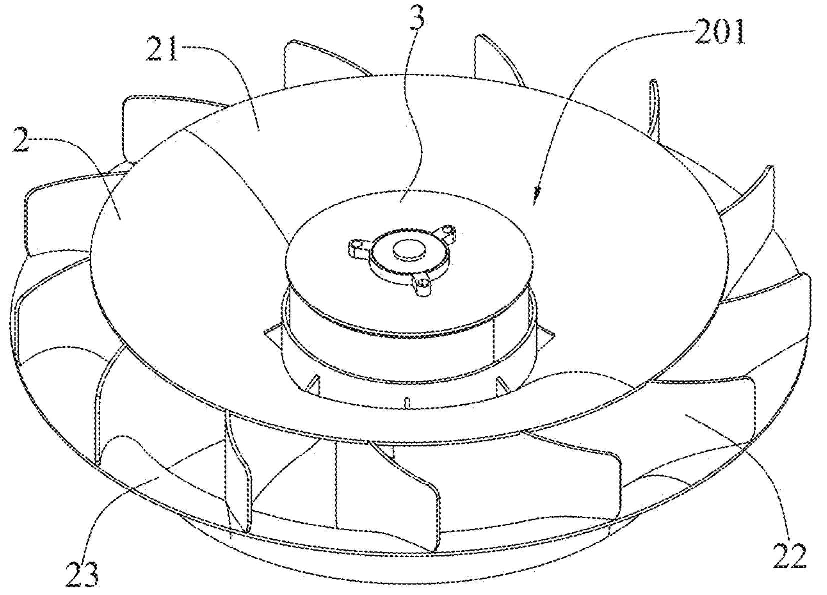
FIG. 6 is a schematic structural diagram of a fan assembly and a drive device in an embodiment of the present disclosure.
Figure 7:
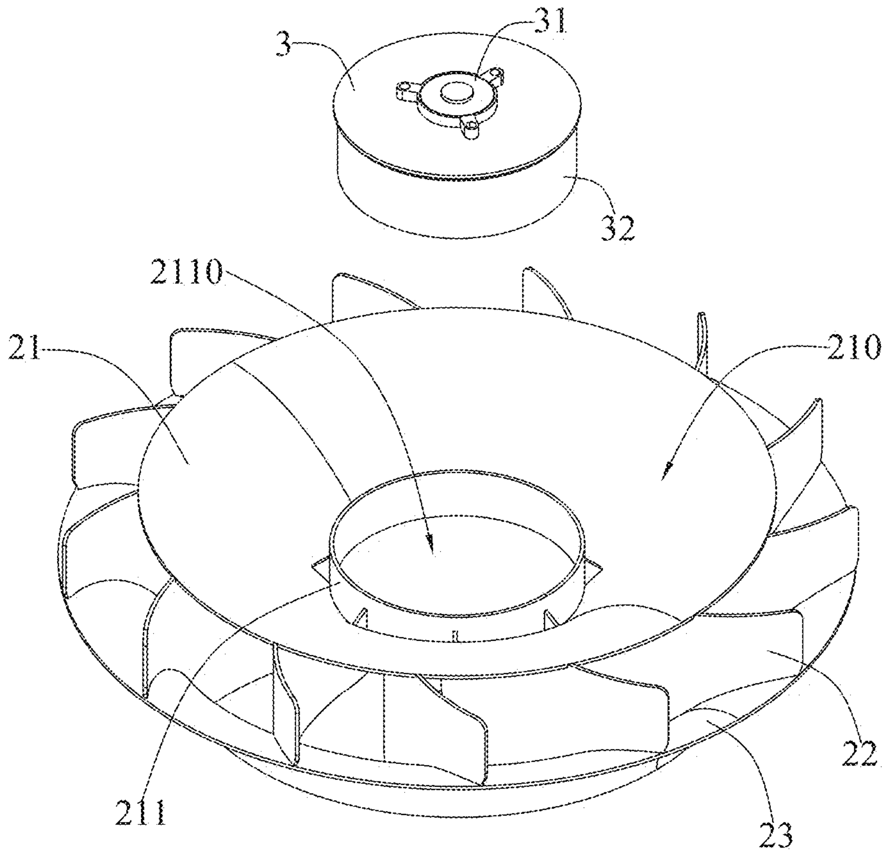
FIG. 7 is an exploded view of a fan assembly and a drive device in an embodiment of the present disclosure.
Figure 8:
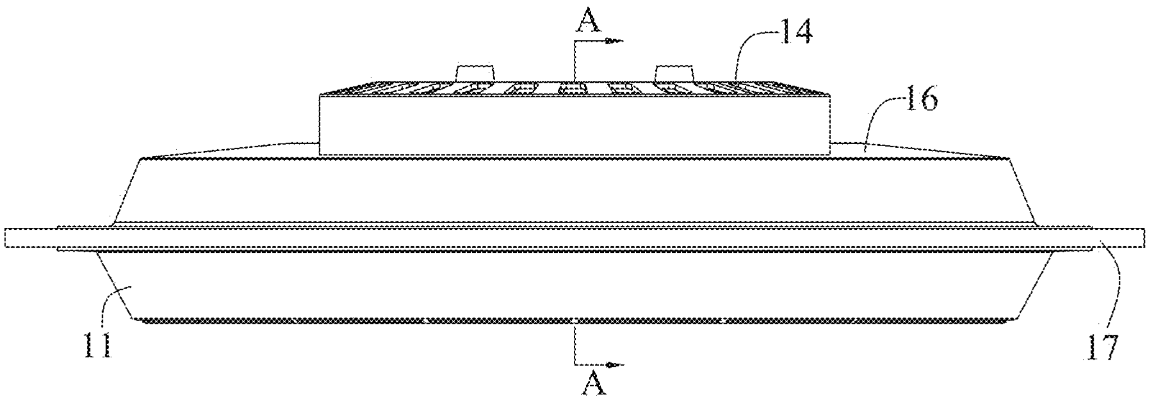
FIG. 8 is a front view corresponding to FIG. 1.
Figure 9:
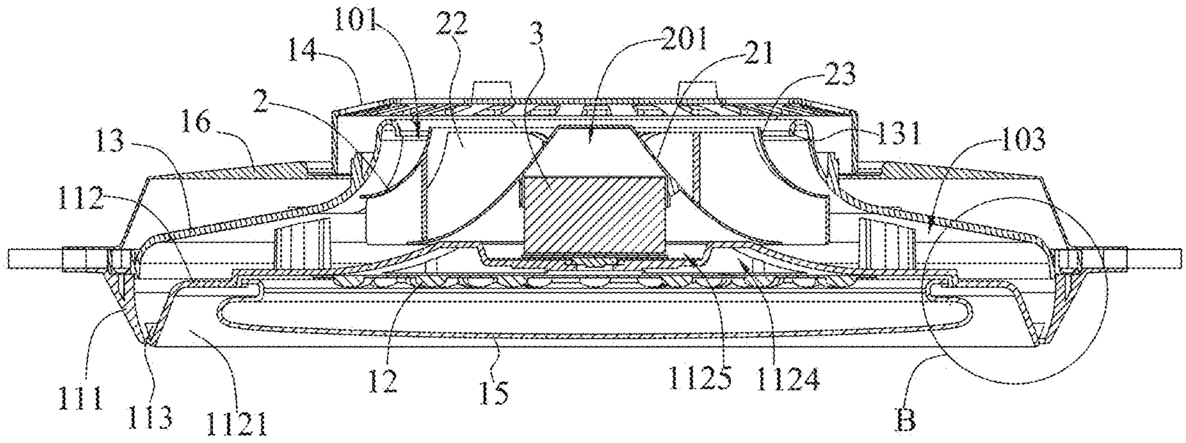
FIG. 9 is a sectional view after sectioning along the section line A-A in FIG. 8.
Figure 10:
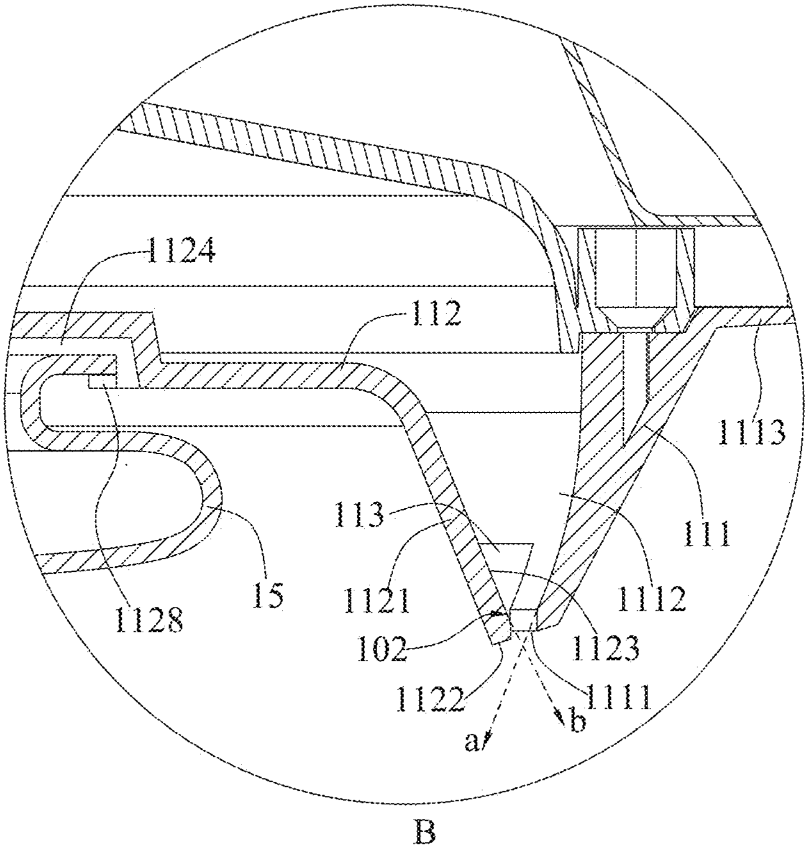
FIG. 10 is an enlarged view corresponding to detail B in FIG. 9.

1, lamp body; 101, air inlet; 102, air outlet; 103, second mounting chamber; 11, air outlet hood; 111, first air guide portion; 1111, first end; 1112, first air guide end surface; 1113, carrying edge; 112, air outlet hood body; 1121, second air guide portion; 1122, second end; 1123, second air guide end surface; 1124, first assembling groove; 1125, second assembling groove; 1126, threading hole; 1127, reinforcing bar; 1128, first snap-in portion; 1129, concave chamber; 113, connecting portion; 12, light emitting unit; 13, air guide hood; 131, crimped portion; 132, third snap-in portion; 1320, snap-in groove; 1321, limit bump; 133, rib; 14, air inlet grill; 141, fourth snap-in portion; 1411, limit portion; 15, light shield; 151, second snap-in portion; 1510, avoidance notch; 16, lamp top cover; 160, mounting port; 17, auxiliary light source; 2, fan assembly; 21, impeller ring; 210, first mounting chamber; 211, mounting portion; 2110, mounting groove; 22, blade; 23, outer frame; 231, first end surface; 232, second end surface; 3, drive device; 31, first portion; 32, second portion.

DETAILED DESCRIPTION

The present disclosure will be described in detail below with reference to the accompanying drawings and in conjunction with the embodiments. The various examples are provided by way of explanation of the present disclosure and do not limit the present disclosure. Indeed, it will be clear to those skilled in the art that modifications and variations may be made in the present disclosure without departing from the scope or spirit of the present disclosure. For example, features shown or described as part of one embodiment may be used in another embodiment to produce yet another embodiment. Thus, it is expected that the present disclosure encompasses such modifications and variations as are categorized within the scope of the appended claims and their equivalents.

In the description of the present disclosure, the orientation or positional relationships instructed by the terms “longitudinal”, “transverse”, “upper”, “lower”, “front”, “rear”, “left”, “right”, “vertical”, “horizontal”, “top”, “bottom”, etc.

are based on the orientation or positional relationships shown in the accompanying drawings, merely for ease of description of the present disclosure, rather than requiring that the present disclosure must be constructed and operated in a specific orientation, which, therefore, cannot be construed as limiting the present disclosure. The terms "connected", "connecting", and "provided" as used in the present disclosure are to be understood in a broad sense, e.g. as a fixed connection, or a detachable connection; as a direct connection, or an indirect connection through an intermediate part; as a wired electrical connection, a wireless electrical connection, or a wireless communication signal connection. Those of ordinary skill in the art can understood the specific meaning of the above terms through specific situations.

One or more examples of the present disclosure are illustrated in the appended accompanying drawings. Numerical and alphabetic numerals are used in the detailed description to refer to features in the accompanying drawings. Like or similar numerals in the accompanying drawings and description have been used to refer to like or similar portions of the present disclosure. As used herein, the terms "first", "second", "third", etc. are used interchangeably to distinguish one member from another and are not intended to indicate the location or importance of separate members.

Referring to FIGS. 1 to 16, an embodiment provided in the present disclosure relates to a fan ceiling lamp, which is mainly mounted on a ceiling to provide both the effects of lighting and fan blowing.

Referring to FIGS. 1 to 7, in one embodiment, the fan ceiling lamp includes: a lamp body 1, a fan assembly 2, and a drive device 3. The lamp body 1 is provided with an air inlet 101 and an air outlet 102. The fan assembly 2 is movably mounted in the lamp body 1 and can drive, by means of rotation, air in the lamp body 1 to flow, so that airflow enters through the air inlet 101 and wind generated by the rotation is discharged through the air outlet 102. The drive device 3 is also provided in the lamp body 1. Specifically, the drive device 3 includes a first portion 31 and a second portion 32 that is connected to the first portion 31. The first portion 31 is fixedly assembled with the lamp body 1. One end of the second portion 32 that is away from the first portion 31 is fixedly connected to the fan assembly 2. The second portion 32 is capable of rotating relative to the first portion 31 to drive the fan assembly 2 to rotate relative to the lamp body 1.

In one embodiment, the fan assembly 2 includes an impeller ring 21 having a first mounting chamber 210. The drive device 3 is integrally mounted in the first mounting chamber 210. The first portion 31 extends out of the first mounting chamber 210 and is fixedly assembled with the lamp body 1, and the second portion 32 extends to one side of the bottom of the first mounting chamber 210 and is fixedly assembled with an inner side wall of the first mounting chamber 210.

It is to be noted that providing the first mounting chamber 210 in the fan assembly 2 and mounting the drive device 3 in the first mounting chamber 210 can prevent the problem that the spacing between the lamp body 1 and the ceiling is too large when the lamp body 1 is mounted due to the fact that the drive device 3 is mounted outside the lamp body 1. In fact, mounting the drive device 3 in the first mounting chamber 210 can not only reduce the spacing between the lamp body 1 and the ceiling during mounting and improve the aesthetics of the fan ceiling lamp after mounting, but also reduce the overall volume of the fan ceiling lamp, which is more conducive to the packaging and transportation of the fan ceiling lamp. Moreover, providing the drive device 3 in the first mounting chamber 210 can not only protect the drive device 3 during transportation, but also take away heat generated by the drive device 3 when the fan assembly 2 is operating, thereby reducing the operating temperature of the drive device 3 and extending the actual service life of the drive device 3.

Referring further to FIGS. 1 to 7, in one embodiment, a mounting portion 211 is provided in the first mounting chamber 210, and the mounting portion 211 is provided with a mounting groove 2110. The second portion 32 is fixedly mounted in the mounting groove 2110. Obviously, the mounting portion 211 is provided to facilitate the fixed mounting of the second portion 32. Providing the mounting groove 2110 in the mounting portion 211 and mounting the second portion 32 in the mounting groove 2110 can be more conducive to mounting the second portion 32, and can effectively enhance the stability of assembling between the second portion 32 and the impeller ring 21.

In one embodiment, the drive device 3 may be a motor, the first portion 31 is a stator of the motor, and the second portion 32 is a rotor of the motor. In this embodiment, the drive device 3 is an external rotor motor.

In one embodiment, the fan assembly 2 further includes: blades 22 and an outer frame 23. Specifically, a plurality of blades 22 are provided and the plurality of blades 22 are distributed annularly at equal intervals on an outer wall of the impeller ring 21 along the circumference of the impeller ring 21. The outer frame 23 is connected to the sides of the plurality of blades 22 that are away from the impeller ring 21. A cross-sectional area of the outer frame 23 at the side proximal to the first portion 31 is greater than that at the side away from the first portion 31, making it easier for the airflow from the air inlet 101 to enter the lamp body 1.

In one embodiment, the outer frame 23 includes a first end surface 231 and a second end surface 232. The first end surface 231 is fixedly connected to the plurality of blades 22. The second end surface 232 is a concave curved surface, which can not only enlarge the size of the air inlet 101, but also reduce the resistance of the air inlet 101, making it easier for the airflow to enter the lamp body 1 from the air inlet 101.

Referring to FIGS. 8 to 13, in one embodiment, the lamp body 1 includes: an air outlet hood 11, a light emitting unit 12, an air guide hood 13, and an air inlet grill 14.

Specifically, the air outlet hood 11 is fixedly connected to the first portion 31, and the air outlet 102 is provided in the air outlet hood 11. The light emitting unit 12 is connected to the side of the air outlet hood 11 that is away from the first portion 31. The air guide hood 13 is connected to the side of the air outlet hood 11 that is away from the air outlet 102. The air guide hood 13 and the air outlet hood 11 are surrounded to form a second mounting chamber 103. The fan assembly 2 and the drive device 3 are both mounted in the second mounting chamber 103. The air inlet 101 is provided at the side of the air guide hood 13 that is away from the air outlet hood 11, and both the air inlet 101 and the air outlet 102 are communicated with the second mounting chamber 103. The air inlet grill 14 is covered at the air inlet 101 and is detachably connected to the air guide hood 13. The air inlet grill 14 is mainly used to prevent debris from being drawn into the fan assembly 2, and also serves to provide some dust protection.

It is to be noted that when the fan assembly is operating, air enters the second mounting chamber 103 through the air inlet grill 14 and the air inlet 101 and is discharged to the side where the air outlet is located 102 through the drive of the fan assembly 2, so as to generate an air flow underneath the lamp body 1 and form wind, which can not only cool down and eliminate the summer heat, but also stir up and replace the indoor air, realizing indoor air circulation. When mounting the fan ceiling lamp, the air inlet grill 14 is first fixedly mounted on the ceiling by means of fastening screws, and then the lamp body 1 is indirectly mounted to the ceiling by means of detachable assembling between the air guide hood 13 and the air inlet grill 14. The detachable assembling between the air inlet grill 14 and the air guide hood 13 not only facilitates the mounting of the lamp body 1, but also facilitates the maintenance of the lamp body 1.

Referring further to FIGS. 8 to 13, in one embodiment, the air outlet hood 11 includes: a first air guide portion 111, an air outlet hood body 112, and connecting portions 113. The first air guide portion 111 is provided at the periphery of the air outlet hood body 112 and is connected to the air guide hood 13. The side of the first air guide portion 111 that is away from the air guide hood 13 converges toward the side where the light emitting unit 12 is located. The air outlet hood body 112 has a second air guide portion 1121, and the second air guide portion 1121 extends toward the side away from the air guide hood 13. The side of the second air guide portion 1121 that is away from the air guide hood 13 inclines toward the side where the first air guide portion 111 is located. The first air guide portion 111 and the second air guide portion 1121 enclose to form the air outlet 102. The connecting portions 113 are provided between the first air guide portion 111 and the air outlet hood body 112, and both ends thereof are connected to the first air guide portion 111 and the second air guide portion 1121, respectively.

In this embodiment, one end of the first air guide portion 111 that is away from the air guide hood 13 is a first end 1111, and one end of the second air guide portion 1121 that is away from the air guide hood 13 is a second end 1122. The first end 1111 and the second end 1122 are proximal to each other to converge, making the air outlet 102 gradually narrowed in the air-out direction. The air outlet 102 so provided can form a converging effect on the airflow, thereby increasing the air speed when the airflow is discharged through the air outlet 102, increasing the air power, and improving the efficiency of air blowing.

In one embodiment, an end surface of the first air guide portion 111 at the side that is proximal to the second air guide portion 1121 is a first air guide end surface 1112, and the first air guide end surface 1112 is a concave curved surface. Obviously, the airflow generated when the fan assembly 2 is operating enters from the air inlet 101 and flows through the second mounting chamber 103 and then is discharged through the air outlet 102. The airflow will flow through the first air guide end surface 1112 in the process of passing through the second mounting chamber 103. The first air guide end surface 1112 defined as a concave curved surface can guide and change the direction of the airflow, so that the airflow is discharged from the second mounting chamber 103 in a tangent direction a at an outlet of the concave curved surface, increasing the range of air blowing, thereby further improving the efficiency of air blowing.

In one embodiment, an end surface of the second air guide portion 1121 at the side that is proximal to the first air guide end surface 1112 is a second air guide end surface 1123, and the second air guide end surface 1123 is an inclined surface. The spacing between the inclined surface and the first air guide end surface 1112 is gradually reduced in an air-out direction. Obviously, when the airflow flows through the second air guide end surface, the inclined surface can guide and change the direction of the airflow, so that the airflow is discharged from the second mounting chamber 103 in a direction b of the inclined surface, further increasing the range of air blowing, thereby further improving the efficiency of air blowing. In other embodiments, the second air guide end surface 1123 may also be a concave curved surface.

It is to be noted that the provision of the first air guide end surface 1112 and the second air guide end surface 1123 enables the airflow, when discharged to the air outlet 102 after passing through the second mounting chamber 103, to blow to the ground side along the angular range of the direction a and the direction b, effectively increasing the range of air blowing and improving the efficiency of air blowing.

Referring further to FIGS. 8 to 13, in one embodiment, a first assembling groove 1124 is provided in an end surface of the air outlet hood body 112 at the side that is away from the air guide hood 13, and the light emitting unit 12 is fixedly mounted in the first assembling groove 1124, so that the overall thickness of the lamp body 1 can be further reduced, thereby reducing the volume of the lamp body 1.

In one embodiment, a second assembling groove 1125 is provided in an end surface of the air outlet hood body 112 at the side that is proximal to the air guide hood 13. The second assembling groove 1125 forms a raised circular table structure within the first assembling groove 1124. The first portion 31 of the drive device 3 extends out of the first mounting chamber 210 and is fixedly assembled with the bottom of the second assembling groove 1125 by means of fastening screws. The provision of the second assembling groove 1125 can increase the mounting space of the drive device 3, which is more conductive to mounting the drive device 3 in the lamp body 1.

In one embodiment, the light emitting unit 12 is a lamp board provided with a plurality of lamp beads. The bottom of the first assembling groove 1124 is provided with threading holes 1126 through which the air outlet hood body 112 is threaded, and the bottom of the second assembling groove 1125 is provided with perforation holes communicated with the first assembling groove 1124. Wires are electrically connected to the light emitting unit 12 through the threading holes 1126, and are electrically connected to the drive device 3 and the fan assembly 2 through the perforation holes.

In one embodiment, a plurality of reinforcing bars 1127 that are distributed annularly at equal intervals are provided at the bottom of the first assembling groove 1124, to enhance the overall structural strength of the air outlet hood 11. Threading holes are formed in the reinforcing bars 1127, and the light emitting unit 12 is fixedly mounted in the first assembling groove 1124 by fitting the fastening screws with the threading holes.

Figure 11:
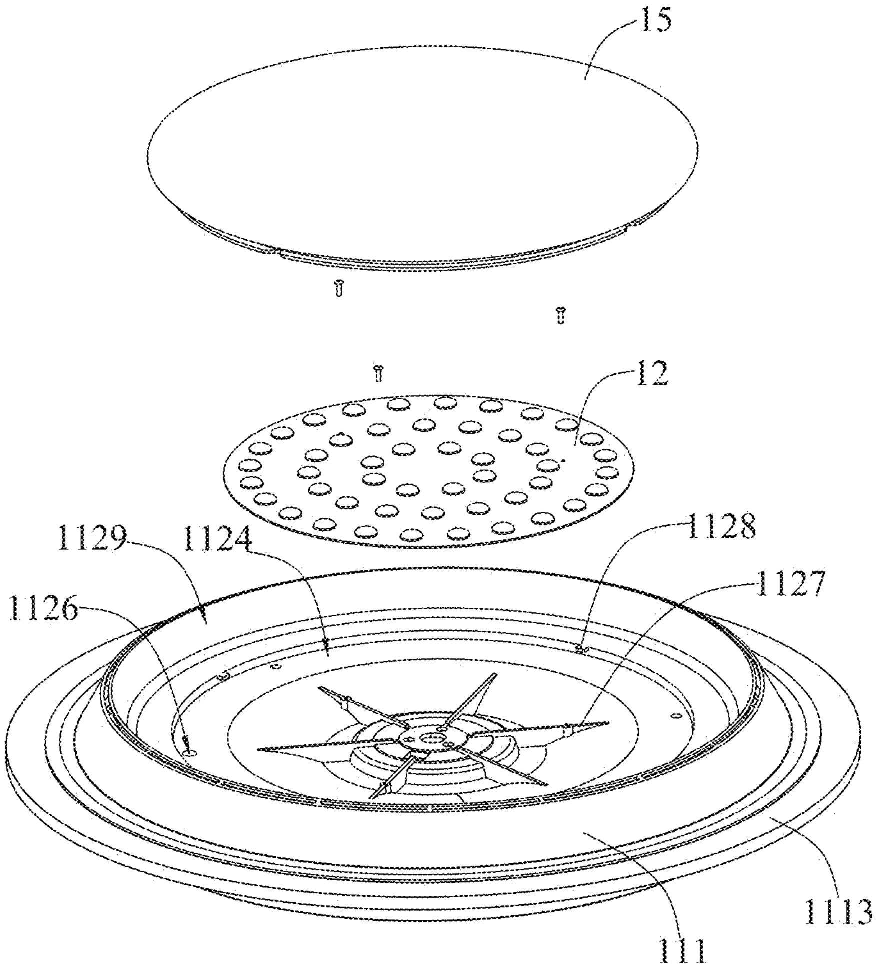
FIG. 11 is an exploded view of a fan ceiling lamp in another embodiment of the present disclosure.
Figure 12:
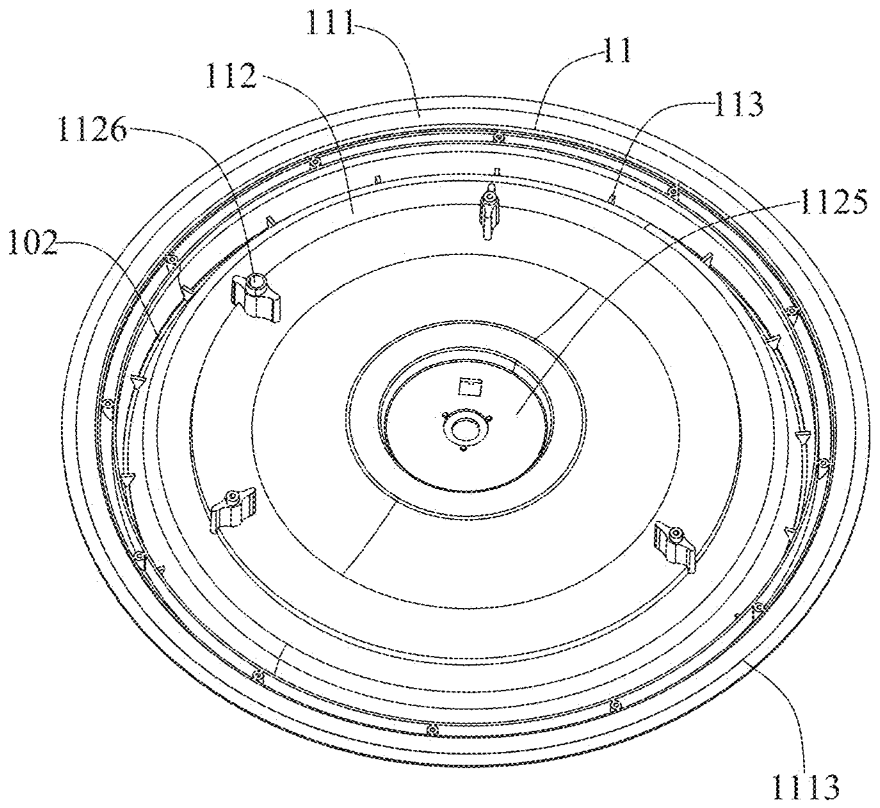
FIG. 12 is a schematic structural diagram of an air outlet hood in an embodiment of the present disclosure.
Figure 13:
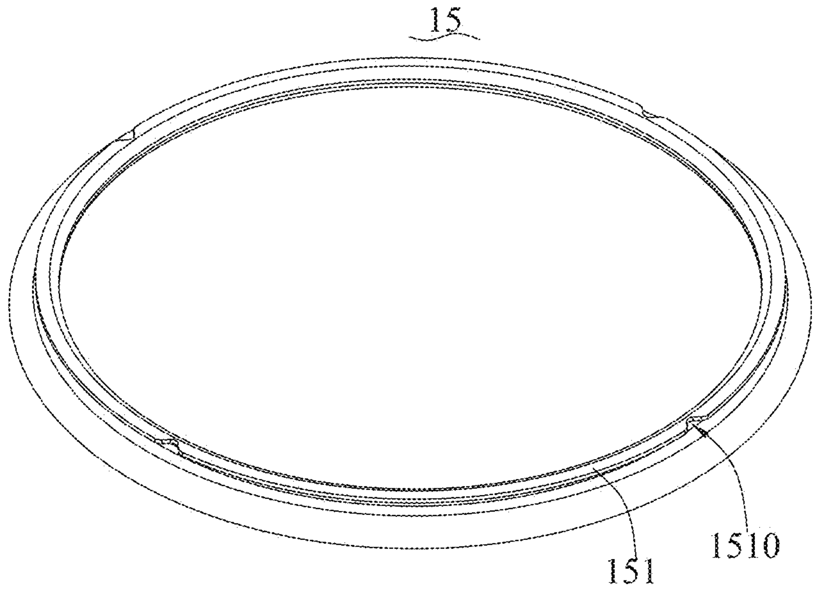
FIG. 13 is a schematic structural diagram of a light shield in an embodiment of the present disclosure.
Figure 14:
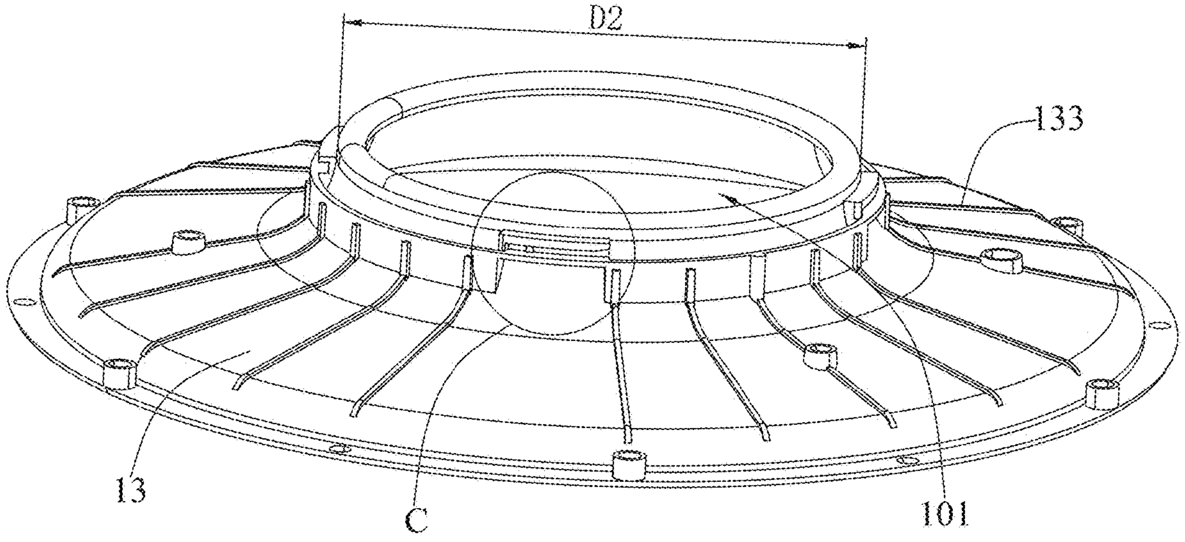
FIG. 14 is a schematic structural diagram of an air guide hood in an embodiment of the present disclosure.
Figure 15:
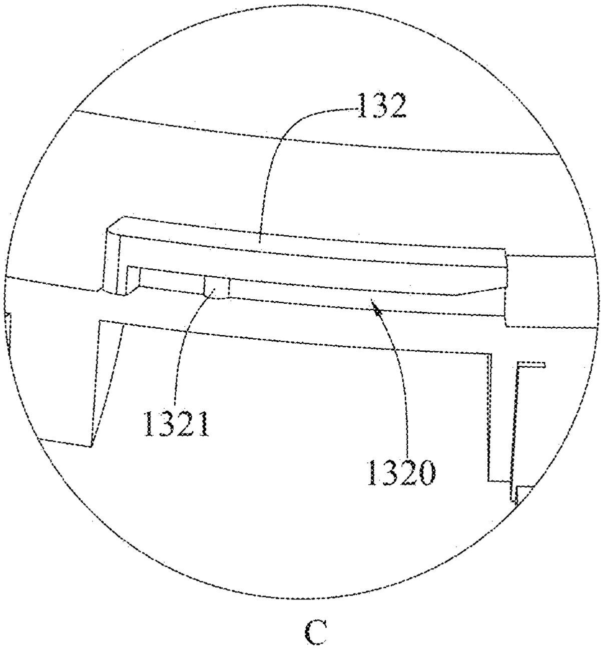
FIG. 15 is an enlarged view corresponding to detail C in FIG. 14.
Figure 16:
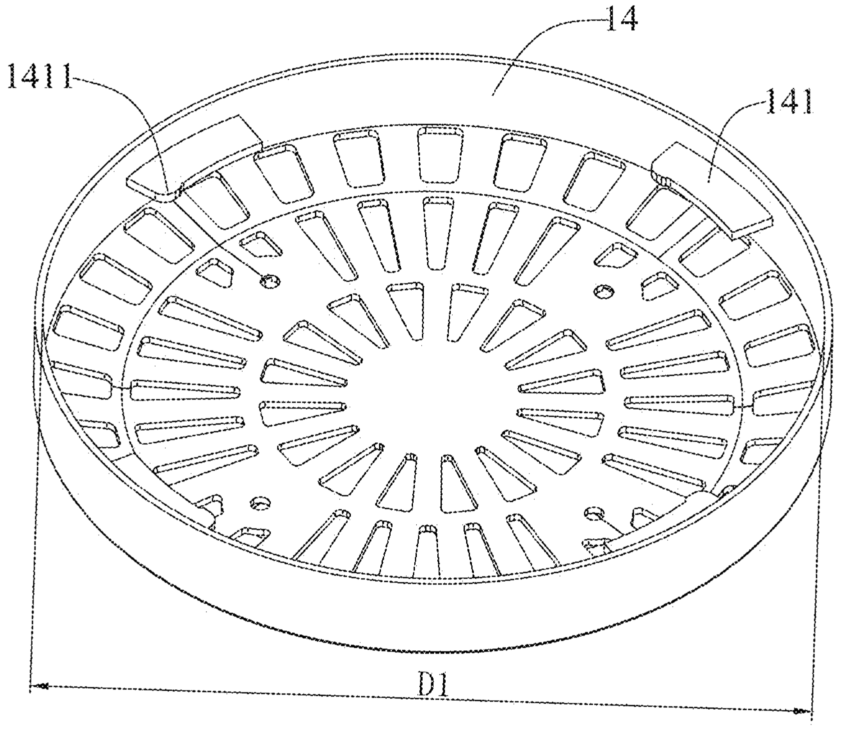
FIG. 16 is a schematic structural diagram of an air inlet grill in an embodiment of the present disclosure.

Referring to FIGS. 11 and 13, in one embodiment, the lamp body 1 further includes a light shield 15, which is mounted in the first assembling groove 1124 and is detachably assembled with the air outlet hood body 112 to allow the light shield 15 to be mounted, replaced, and cleaned.

In one embodiment, a first snap-in portion 1128 is provided on an inner side wall of the first assembling groove 1124. A second snap-in portion 151 is provided on the light shield 15. The light shield 15 is detachably mounted in the first assembling groove 1124 through the snap-in fit between the first snap-in portion 1128 and the second snap-in portion 151.

In one embodiment, the first snap-in portion 1128 is a protrusion provided on the inner side wall of the first assembling groove 1124, and a mounting gap is formed between the protrusion and the bottom of the first assembling groove 1124. The second snap-in portion 151 is an outwardly turned edge of the light shield 15 at the side that is proximal to the light emitting unit 12, and the outwardly turned edge is provided with an avoidance notch 1510. A plurality of first snap-in portions 1128 are provided and the plurality of first snap-in portions 1128 are distributed annularly at equal intervals on the inner side wall of the first assembling groove 1124. Correspondingly, a plurality of avoidance notches 1510 are provided and the plurality of avoidance notches 1510 are distributed annularly at equal intervals in the second snap-in portion 151.

In this embodiment, four first snap-in portions 1128 are provided, and four avoidance notches 1510 are provided corresponding to the first snap-in portions 1128. When mounting the light shield 15, it is necessary to push the light shield 15 toward the side where the light emitting unit 12 is located after aligning the four first snap-in portions 1128 with the four avoidance notches 1510. After the second snap-in portion 151 is in contact with the bottom of the first assembling groove 1124, the light shield 15 is rotated to make the second snap-in portion 151 enter the mounting gap, so that the second snap-in portion 151 cooperates with the first snap-in portions 1128 to complete the mounting of the light shield 15. The light shield 15 so provided is not only simple in structure, but also very easy to disassemble and assemble, which is conducive to the mounting, replacement and cleaning of the light shield 15.

It is to be noted that the second air guide portion 1121 of the air outlet hood body 112 extends along the side away from the air guide hood 13 to enclose to form a concave chamber 1129. The first assembling groove 1124 is provided at the bottom of the concave chamber 1129. Both the light shield 15 and the light emitting unit 12 are mounted in the concave chamber 1129. With the lamp body 1 so provided, the second air guide portion 1121 can also play a role in concentrating light to improve the lighting effect of the lamp body 1.

In one embodiment, a plurality of connecting portions 113 are provided and the plurality of connecting portions 113 are all provided between the first air guide portion 111 and the second air guide portion 1121. The plurality of connecting portions 113 are distributed annularly at equal intervals along the circumference of the air outlet hood body 112, and both ends of each of the plurality of connecting portions 113 are fixedly connected to the first air guide portion 111 and the second air guide portion 1121, respectively. The provision of the plurality of connecting portions 113 can effectively improve the stability of connection between the air outlet hood body 112 and the first air guide portion 111.

Referring to FIGS. 8, 9, and 14 to 16, in one embodiment, a crimped portion 131 is provided at an end of the air guide hood 13 at the side that is away from the air outlet hood 11. The crimped portion 131 encircles the air inlet 101 and curls toward the second mounting chamber 103. The air guide hood 13 so provided can not only prevent scratching due to sharp edges of the air inlet 101 when mounting the lamp body 1 to ensure the safety during the mounting process of the lamp body 1, but also prevent the airflow from being discharged outwardly through the air inlet 101, improving the air blowing effect of the fan assembly 2.

In one embodiment, a third snap-in portion 132 is provided at the side of the air guide hood 13 that is away from the air outlet hood 11. A fourth snap-in portion 141 is provided on the air inlet grill 14. The third snap-in portion 132 cooperates with the fourth snap-in portion 141 to detachably mount the air inlet grill 14 at the air inlet 101 of the air guide hood 13, facilitating the disassembling and assembling as well as maintenance of the lamp body 1.

Specifically, the third snap-in portion 132 includes a snap-in groove 1320 in which a limit bump 1321 is provided in a protruding manner. The fourth snap-in portion 141 is provided on an inner side wall of the air inlet grill 14 in a protruding manner and is snapped in the snap-in groove 1320 when assembling. The fourth snap-in portion 141 is provided with a limit portion 1411 which cooperates with the limit bump 1321 to limit the fourth snap-in portion 141 in the snap-in groove 1320. Obviously, the cooperation between the limit portion 1411 and the limit bump 1321 can improve the stability of assembling between the third snap-in portion 132 and the fourth snap-in portion 141. Meanwhile, positioning can also be performed when the third snap-in portion 132 is snapped in the fourth snap-in portion 141, facilitating an installer in snapping the third snap-in portion 132 in the fourth snap-in portion 141 accurately.

Referring to FIGS. 1 to 4 and 8 to 16, in one embodiment, a plurality of third snap-in portions 132 are provided and the plurality of third snap-in portions 132 are distributed annularly at equal intervals on an outer wall of the air guide hood 13 along the circumference of the air inlet 101. A plurality of fourth snap-in portions 141 are provided corresponding to the third snap-in portions 132. The plurality of fourth snap-in portions 141 cooperate with the plurality of third snap-in portions 132 in one-to-one correspondence.

In this embodiment, the top of the air inlet grill 14 is set as a grid structure, and air enters the second mounting chamber 103 through the through holes of the grid structure. A plurality of ribs 133 are provided on an end surface of the air guide hood 13 at the side that is away from the air outlet hood 11, to enhance the overall structural strength of the air guide hood 13. The air guide hood 13 is also provided with apertures adapted to the threading holes, to allow wires to be threaded out of the air guide hood 13. It is to be noted that the positions where the third snap-in portions 132 and the fourth snap-in portions 141 are provided can be interchanged, as long as the requirement that mutual cooperation can realize the detachable assembling between the air inlet grill 14 and the air guide hood 13 can be met.

In one embodiment, the lamp body 1 further includes a lamp top cover 16 covered on the air guide hood 13. A mounting port 160 is provided in the lamp top cover 16 at the side that is away from the air outlet hood 11, and one end of the air guide hood 13 that is away from the air outlet hood 11 is threaded through the mounting port 160 and then assembled with the air inlet grill 14. The lamp top cover 16 provided can not only cover the air guide hood 13 and improve the overall aesthetics of the lamp body 1, but also has a dustproof effect.

In one embodiment, the inner diameter D1 of the air inlet grill 14 is greater than the outer diameter D2 of the air inlet 101. The inner diameter D3 of the mounting port 160 is greater than the outer diameter D2 of the air inlet 101 and less than or equal to the inner diameter D1 of the air inlet grill 14. During assembling, the lamp top cover 16 is first covered on the air guide hood 13, and the portion of the air guide hood 13 that has the air inlet 101 is threaded through the mounting port 160; the air inlet grill 14 is then covered on the air inlet 101 and rotationally snapped in the air guide hood 13, so that the air inlet grill 14 firmly presses and fixes the lamp top cover 16 to the outer wall of the air guide hood 13. The lamp top cover 16 so provided not only can cover the screws and ribs 133 on the air guide hood 13, but also can be fixedly mounted without screws, greatly improving the aesthetics of the fan ceiling lamp.

In one embodiment, the lamp body 1 further includes an auxiliary light source 17, which is firmly pressed by the lamp top cover 16 to be secured to the air outlet hood 11. Specifically, a carrying edge 1113 is provided at the side of the first air guide portion 111 that is proximal to the lamp top cover 16, and the auxiliary light source 17 is carried on the carrying edge 1113 and is firmly pressed by the lamp top cover 16 to be secured. In this embodiment, the auxiliary light source 17 is a flexible light strip.

It can be seen, from the above description, that the above embodiments of the present disclosure realize the following technical effects:

1) Mounting the drive device 3 in the first mounting chamber 210 can not only reduce the spacing between the lamp body 1 and the ceiling during mounting and improve the aesthetics of the fan ceiling lamp after mounting, but also reduce the overall volume of the fan ceiling lamp, which is more conducive to the packaging and transportation of the fan ceiling lamp. Moreover, providing the drive device 3 in the first mounting chamber 210 can not only protect the drive device 3 during transportation, but also take away the heat generated by the drive device 3 when the fan assembly 2 are operating, thereby reducing the operating temperature of the drive device 3 and extending the actual service life of the drive device 3.

2) When the fan assembly is operating, air enters the second mounting chamber 103 through the air inlet grill 14 and the air inlet 101 and is discharged to the side where the air outlet is located 102 through the drive of the fan assembly 2, so as to generate an air flow underneath the lamp body 1 and form wind, which can not only cool down and eliminate the summer heat, but also stir up and replace the indoor air, realizing indoor air circulation.

3) When mounting the fan ceiling lamp, the air inlet grill 14 is first fixedly mounted on the ceiling by means of fastening screws, and then the lamp body 1 is indirectly mounted to the ceiling by means of detachable assembling between the air guide hood 13 and the air inlet grill 14. The detachable assembling between the air inlet grill 14 and the air guide hood 13 not only facilitates the mounting of the lamp body 1, but also facilitates the maintenance of the lamp body 1.

4) The first end 1111 and the second end 1122 are proximal to each other to converge, making the air outlet 102 gradually narrowed in the air-out direction. The air outlet 102 so provided can form a converging effect on the airflow, thereby increasing the air speed when the airflow is discharged through the air outlet 102, increasing the air power, and improving the efficiency of air blowing.

5) The provision of the first air guide end surface 1112 and the second air guide end surface 1123 enables the airflow, when discharged to the air outlet 102 after passing through the second mounting chamber 103, to blow to the ground side along the angular range of the direction a and the direction b, effectively increasing the range of air blowing.

The embodiments described above are only preferred embodiments of the present disclosure and are not intended to limit the present disclosure. The present disclosure may be subject to various changes and variations for those skilled in the art. Any modifications, equivalent substitutions, improvements, etc. made within the spirit and principles of the present disclosure shall be included in the scope of protection of the present disclosure.

The invention claimed is:

1. A fan ceiling lamp, comprising:

a lamp body provided with an air inlet and an air outlet;

a fan assembly movably mounted in the lamp body, the fan assembly comprising an impeller ring having a first mounting chamber; and a drive device comprising a first portion and a second portion that is connected to the first portion, the first portion extending out of the first mounting chamber and being fixedly assembled with the lamp body, one end of the second portion being connected to the impeller ring, and the second portion being capable of rotating relative to the first portion to drive the fan assembly to rotate relative to the lamp body;

wherein the lamp body comprises:

an air outlet hood fixedly connected to the first portion, the air outlet hood defining the air outlet; and an air guide hood connected to another side of the air outlet hood, the air guide hood and the air outlet hood surrounding to form a second mounting chamber in which the fan assembly and the drive device are both mounted, the air guide hood defining the air inlet, and both the air outlet and the air inlet being communicated with the second mounting chamber.

2. The fan ceiling lamp according to claim 1, wherein a mounting portion is provided in the first mounting chamber, and the second portion extends into the first mounting chamber and is assembled with the mounting portion.

3. The fan ceiling lamp according to claim 2, wherein the fan assembly further comprises:

a plurality of blades distributed annularly at equal intervals on an outer wall of the impeller ring; and an outer frame connected to the plurality of blades, a cross-sectional area of the outer frame at a side proximal to the first portion being greater than a cross-sectional area of the outer frame at another side away from the first portion.

4. The fan ceiling lamp according to claim 3, wherein the outer frame comprises a first end surface and a second end surface, the first end surface is connected to the plurality of blades, and the second end surface is a concave curved surface.

5. The fan ceiling lamp according to claim 1, wherein the lamp body further comprises:

a light emitting unit connected to a side of the air outlet hood;

an air inlet grill covering the air inlet and detachably connected to the air guide hood.

6. The fan ceiling lamp according to claim 5, wherein the air outlet hood comprises:

a first air guide portion connected to the air guide hood, one side of the first air guide portion converging toward the light emitting unit;

an air outlet hood body provided with a second air guide portion, the second air guide portion extending away from the air guide hood, one side of the second air guide portion inclining toward the first air guide portion, and the first air guide portion and the second air guide portion enclosing to form the air outlet; and a connecting portion, two ends of the connecting portion connected to the first air guide portion and the second air guide portion, respectively.

7. The fan ceiling lamp according to claim 6, wherein the first air guide portion has a first air guide end surface, which is a concave curved surface.

8. The fan ceiling lamp according to claim 6, wherein an end surface of the air outlet hood body is provided with a first assembling groove, and the light emitting unit is fixedly mounted in the first assembling groove.

9. The fan ceiling lamp according to claim 8, wherein the lamp body further comprises a light shield, the light shield is mounted in the first assembling groove and is detachably assembled with the air outlet hood body.

10. The fan ceiling lamp according to claim 9, wherein a first snap-in portion is provided on an inner wall of the first assembling groove, a second snap-in portion is provided on the light shield, and the second snap-in portion engages with the first snap-in portion to detachably mount the light shield to the air outlet hood body.

11. The fan ceiling lamp according to claim 5, wherein a crimped portion is provided at an end of the air guide hood, and the crimped portion encircles the air inlet and curls toward the second mounting chamber.

12. The fan ceiling lamp according to claim 5, wherein a third snap-in portion is provided at one side of the air guide hood, a fourth snap-in portion is provided on the air inlet grill, and the third snap-in portion engages with the fourth snap-in portion to detachably mount the air inlet grill at the air inlet of the air guide hood.

13. The fan ceiling lamp according to claim 12, wherein the third snap-in portion comprises a snap-in groove in which a limit bump is provided; the fourth snap-in portion is provided on an inner side wall of the air inlet grill and is snapped in the snap-in groove, and the fourth snap-in portion is provided with a limit portion which engages with the limit bump to limit the fourth snap-in portion in the snap-in groove.

14. The fan ceiling lamp according to claim 13, wherein a plurality of the third snap-in portions are provided and the plurality of the third snap-in portions are distributed annularly at equal intervals on an outer wall of the air guide hood along a peripheral of the air inlet, and a plurality of the fourth snap-in portions are provided in one-to-one correspondence with the plurality of the third snap-in portions.

15. The fan ceiling lamp according to claim 5, wherein the lamp body further comprises a lamp top cover covered on the air guide hood, a mounting port is provided in the lamp top cover, and one end of the air guide hood is threaded through the mounting port to be assembled with the air inlet grill.

16. The fan ceiling lamp according to claim 15, wherein an inner diameter of the air inlet grill is greater than an outer diameter of the air inlet, and an inner diameter of the mounting port is greater than the outer diameter of the air inlet and less than or equal to the inner diameter of the air inlet grill; and the air inlet grill engages with the air guide hood to fix the lamp top cover.

17. The fan ceiling lamp according to claim 15, wherein the lamp body further comprises an auxiliary light source, and the lamp top cover secures the auxiliary light source to the air outlet hood.

* * * * *